United States Patent [19]

Poth et al.

[11] 4,315,053

[45] Feb. 9, 1982

[54] BASE COATS COVERED BY A CLEAR LACQUER COATING AND PROCESS FOR COATING

[75] Inventors: Ulrich Poth, Münster; Dieter Möller, Ascheberg; Arnold Dobbelstein, Cologne, all of Fed. Rep. of Germany

[73] Assignee: BASF Farben & Fasern AG, Hamburg, Fed. Rep. of Germany

[21] Appl. No.: 153,852

[22] Filed: May 28, 1980

Related U.S. Application Data

[63] Continuation-in-part of Ser. No. 124,570, Feb. 25, 1980, abandoned, which is a continuation of Ser. No. 12,723, Feb. 16, 1979, abandoned.

[30] Foreign Application Priority Data

Feb. 16, 1978 [DE] Fed. Rep. of Germany ....... 2806497

[51] Int. Cl.$^3$ .................... B32B 15/08; B44D 1/14
[52] U.S. Cl. ................. 428/423.7; 427/388.3; 427/388.5; 427/389.7; 427/393.5; 427/407.2; 427/409; 427/412.1; 428/424.4; 428/425.3; 428/430; 428/442; 428/458; 428/463; 428/483; 525/157; 525/443

[58] Field of Search ............. 427/385.5, 388.2, 388.5, 427/409, 388.3, 389.7, 393.5, 407.2, 412.1; 428/458, 423.7, 424.4, 425.3, 430, 442, 463, 483; 525/157, 443

[56] References Cited

U.S. PATENT DOCUMENTS 3,061,459 10/1962 Bader ............................ 427/409 X
3,639,147 2/1972 Benefiel et al. ................. 427/409 X
4,208,465 6/1980 Chang ............................ 427/409 X

FOREIGN PATENT DOCUMENTS 49-31294 8/1974 Japan .................................. 427/409
53-49599 11/1978 Japan .

*Primary Examiner*—Michael R. Lusignan
*Attorney, Agent, or Firm*—Wells & Wells

[57] ABSTRACT

An article having a substrate and a multilayer coating composition adhered thereto. The multilayer coating has a pigmented base film and deposited on the base film is a transparent coating which has no intermixing and no intersolution between the base coating and the transparent coating. The transparent coating is a cross linking resin containing hydroxyl groups obtained by esterifying polycarboxylic acids with polyols.

14 Claims, No Drawings

BASE COATS COVERED BY A CLEAR LACQUER COATING AND PROCESS FOR COATING

CROSS-REFERENCE TO RELATED APPLICATIONS

The present application is a continuation-in-part of application Ser. No. 124,570, filed Feb. 25, 1980, and now abandoned, which in turn is a continuation of application Ser. No. 12,723, filed Feb. 16, 1979 and now abandoned.

Applicants claim piority under 35 USC 119 for application No. P 28 06 497.3, filed Feb. 16, 1978 in the Patent Office of the Federal Republic of Germany. A copy of the priority document is in the file of application Ser. No. 12,723, filed Feb. 16, 1979.

BACKGROUND OF THE INVENTION

The present invention relates to a base coat where the last and cover layer is a clear lacquer which contains a modified polyester resin as the essential film-forming agent, prepared by ensuing baking, and it further relates to a coating process for making such an enamel multicoat. The last layer of the base coat to be covered by the clear-lacquer coat contains pigments and/or metal pigments. The clear-lacquer coating is meant to protect the overall enamel against mechanical, chemical and weather-induced stresses, and furthermore, it is meant to contribute to reinforcing esthetic effects, for instance in the case of metal-effect or luster enamel. Base coats built up from at least one layer of lacquers are used in high-grade baking enamels, for instance in motor vehicle enameling. The clear lacquer coating forming the last layer of the base coat as a rule will be baked. It is obtained from clear lacquers containing alkyd resins from phthalic acids and polyols modified with various fatty acids or other monocarboxylic acids as film-forming agents, and aminoplast resins.

The state of the art of articles having a multilayer coating and processes for producing the same may be ascertained by reference to U.S. Pat. No. 3,639,147 of Benefiel et al which issued Feb. 1, 1972, the disclosure of which is incorporated herein.

According to Benefiel et al, an article having a substrate and a multilayer coating adhered thereto is formed from a composition comprising:

A. a dried nonaqueous base film produced from a composition comprising:
1. a first film-forming material selected from the group consisting of alkyd resins, polyester resins, acrylic resins, and polyurethane resins, wherein said first film-forming material contains from about 2 to about 50 weight percent, based on the film-forming solids, of a cellulose ester,
2. uniformly dispersed pigments, and
3. volatile organic solvents for said first film-forming material, and B. a baked transparent coating composition deposited on said base film in a relationship to maintain substantially no intermixing and no intersolution of said base film and said transparent coating composition, said transparent coating composition comprising:
1. a second film-forming material selected from the group consisting of alkyd resins, polyester resins, acrylic resins and polyurethane resins, and
2. volatile organic solvents for said second film-forming material.

In the specification of U.S. Pat. No. 3,639,147, a clear coat is applied to a basecoat containing metal pigments. Two different proposals are made for the composition of the clear coat. One refers to the use of acrylate resins in combination with aminoplast resins as binder (Column 3). The second proposal relates to alkyd resins as binders, namely those consisting of polybasic acids and polyols and which, moreover, are modified with fatty acids (Column 4 to Column 5, line 30). The polyester resins of the present application differ from the polyester resins of U.S. Pat. No. 3,639,147 in that the polyester resins may not have any aromatic groups within the molecular structure. Only when this happens, will there be no cracking of the clear coat in the case of solar radiation. The present invention can additionally contain acrylate resins, but these resins, too, whould not have aromatic groups in their structure. When there are any aromatic groups in the molecule the crack resistance of the coating is lost. The more aromatic groups the molecule contains, the more the crack resistance worsens. The upper limit, whereby aromatic groups should not be contained in the molecule of the acrylate resin amounts to about 15%.

Alkyd resins containing essentially phthalic acids as the esterification component and modified with saturated and/or unsaturated monocarboxylic acids are known together with aminoplast resins as the binder component in coating compositions which offer high-grade coatings. The aminoplast resins are preferably used in the form of melamine formaldehyde resins and the coating compositions are in the form of solutions in organic solvents. In many cases, the coating compositions also contain levelling agents, surfactants or reaction catalysts.

Other clear lacquers besides the alkyd resins also contain poly(meth)acrylates or their copolymers. Occasionally the alkyd resins may also be replaced entirely by such poly(meth)acrylates or copolymers. They are obtained by copolymerizing (meth)acrylic acid esters of monovalent alcohols with (meth)acrylic acid esters containing functional hydroxyl groups. They may also contain other comonomers such as styrene, vinyl toluol, vinyl ester and also small amounts of monomers containing carboxyl groups polymerized therein. These acrylate resins also are used in combination with aminoplast resins in organic solvents.

These known clear lacquers are characterized by good hardness, elasticity and resistance to chemical corrosion. When used as covering lacquers in enamel multi-coats in which the last layer to be covered contains metal pigments, that is, for metallic looking enamels, the known clear lacquers following exposure to weather and ultra-violet illumination—as is the case in sunny climates—will crack. Where clear lacquers made of acrylate resins are concerned, they are furthermore difficult to apply and clear coatings made of them following exposure to weather or ultraviolet light also tend to become matte, whereby the metallic effect becomes unsightly.

SUMMARY OF THE INVENTION

The present invention has an an object the creation of polyester resins and correspondingly also coating compositions which can be used as the clear lacquer for enamel multiple coats and which are free from those drawbacks of the prior art and thereby will expand the applicability of enamel multicoats with clear lacquer coatings.

The object of the present invention was surprisingly achieved by means of an enamel multicoat where the last layer is a clear lacquer coating containing as the essential film-forming agent a polyester resin besides any aminoplast resins and prepared by ensuing baking, which is characterized in that the polyester resin of the clear lacquer is a cross-linking resin containing hydroxyl groups obtained by esterifying aliphatic and/or cycloaliphatic polycarboxylic acids with aliphatic and/or cycloaliphatic polyols.

The term "polyester resins" in the sense of the present invention comprises saturated polyester resins, alkyd resins and polyester resins containing urethane groups. This includes polyester resins containing hydroxyl groups from polycarboxylic acids and polyols. They may be additionally modified by saturated and/or unsaturated monocarboxylic acids and/or aromatic monocarboxylic acids. In the polyester resin groups containing urethane groups or in the alkyd resins, part of the polycarboxylic acids is replaced by polyisocyanates. For the sake of simplicity therefore all the above cited resins will be termed as "polyester resins" below.

In another embodiment the clear lacquer contains an acrylate resin containing hydroxyl groups as a further film forming agent.

As regards an advantageous embodiment, the clear lacquer contains, for 10 to 40% by weight of aminoplast resin, up to 60 to 90% by weight of a mixture of 5 to 100% by weight of a polyester resin containing hydroxyl groups and from 0 to 95% by weight of an acrylate resin containing hydroxyl groups, the sums of these percentages by weight adding up to 100%.

Another object of the present invention furthermore is that the outer layer of the enamel multicoats covered by the clear lacquer coating contains pigments and/or metal pigments.

The base coat is applied on a substrate. The substrates consist of different materials, e.g., of metal, plastic or glass. Preferred substrates are car body sheets. The substrates may be untreated or degreased metals. The substrates may also be pretreated by phosphatizing or chromatizing. Preferred substrates may also be sheets coated with a primer, putty, filler, in one or more layers. It is very advantageous to use such sheets coated with a filler possessing an electro-coat layer as it is known from car bodies.

By the "pigments" of the present invention is meant organic and inorganic coloring pigments, such as titanium dioxide, iron oxide, chrome yellow, chrome green, cadmium pigments, phthalo cyanine blue, phthalo cyanine green, further silica, kaolin, talcum, barium sulphates, chalk, etc.

By the "metal pigments" of the present invention is meant aluminum, copper or other metals in the form of powder or flakes.

It was found that the drawbacks of the prior art do not arise in the presence of weathering if there are no aromatic groups within the lattice structure of the polyester. Even though the results are degraded by the content in aromatic groups, slight amounts of aromatic polycarboxylic acids may be used simultaneously. However, their proportion should not exceed 15% by weight of the total amount of polycarboxylic acid. Aromatic monocarboxylic acids such as benzoic acid, which do not crosslink during the polyesterification, do not significantly affect the weathering parameters.

Still another object of the present invention furthermore is the process for preparing enamel multicoats covered by a clear coating containing a polyester resin as the essential film forming agent besides any aminoplast resins, this clear lacquer coating being deposited on the last layer of the enamel which contains pigments and/or metal pigments, such deposition being followed by baking, the process being characterized in that the polyester resin of the clear lacquer is a crosslinking resin containing hydroxyl groups and obtained by esterifying aliphatic and/or cycloaliphatic polycarboxylic acids with aliphatic and/or cycloaliphatic polyols.

Yet another object of the present invention is the use of a clear lacquer containing a crosslinking polyester resin as the film-forming agent besides any aminoplast resins, this polyester resin containing hydroxyl groups and being obtained by esterifying aliphatic and/or cycloaliphatic polycarboxylic acids with aliphatic and/or cycloaliphatic polyols, this clear lacquer being used as a baking covering lacquer to achieve a clear lacquer coating transparent to ultraviolet light on an enamel multicoat of which the last layer contains pigments and/or metal pigments.

The systems to be protected by the clear lacquer are characterized with respect to the prior art systems by improved resistance to cracking following weathering or exposure to sunlight or ultraviolet light in various weathering tests.

The polyester resins contained in the clear lacquers of the present invention as a rule are used together with aminoplast resins. It is furthermore advantageous in some applications to also use jointly acrylate resins containing hydroxyl groups, in which cases it is necessary that aromatic groups also be absent in these copolymers or be present only in slight amounts. Thus the proportion of monomers which are polymerized-in and which hold aromatic groups should not exceed 15% by weight. In some instances, however, it is possible and in fact appropriate to make use of the polyester resins also as physically drying binders in the clear lacquer.

The clear lacquers of the present invention are used in the form of solutions or dispersions in organic solvents. They permit a wide field of application.

Even though the use of this clear lacquer in the form of solutions or dispersions in organic solvents is preferred and as a rule will be the one used, it is nevertheless possible to neutralize the polyester resins for a sufficiently high acid number with alkalies, ammonia and/or organic amines or quaternary ammonium bases and to use them as water dilutable coating compositions or clear lacquer.

It was surprising and furthermore unforeseeable that the crosslinking polyester resins containing hydroxyl groups and contained in these clear lacquers and obtained by esterifying aliphatic and/or cycloaliphatic polycarboxylic acids with aliphatic and/or cycloaliphatic polyols result in clear lacquers so outstanding in their performance as the final coating of an enamel multicoat that they will evidence practically no cracks or premature matting under weathering or following exposure to sunlight or ultraviolet light in various weathering tests. Clear lacquers of the present invention can easily be worked and meet all the other technological properties required of enamel multicoats completely. The replacement of the aromatic groups by aliphatic and/or cycloaliphatic groups in the polyester resin is decisive for the outstandingly good results and the complete lack of crack formation.

DESCRIPTION OF THE PREFERRED EMBODIMENTS

The polyester resins contained in the clear lacquer of the present invention are esterification products of polycarboxylic acids with polyols and always contain still unesterified carboxyl groups which endow an acid character to the resin, and further still contain free hydroxyl groups which will ensure crosslinking during baking. The degree of acidity of such resins is expressed by the acid number, the magnitude of which depends on the conditions of esterification. The content in free hydroxyl groups is determined by the hydroxyl number. The hydroxyl number is defined by the amount in milligram of KOH required to neutralize the amount of acetic acid consumed by 1 g of resin during acetylation. The suitable polyester resins or alkyd resins have acid numbers between 0 and 150 and a hydroxy number between 20 and 300. The following is to be noted with respect to the individual components of synthesis:

Polycarboxylic acids in the sense of the present invention are aliphatic and/or cycloaliphatic polycarboxylic acids. Suitable aliphatic polycarboxylic acids for instance are succinic acid, adipic acid and sebacic acid. Suitable cycloaliphatic polycarboxylic acids are in particular those of the general formula:

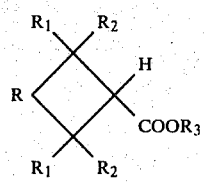

where R represents a non-substituted residue or an alkylene residue with 1 to 4 C atoms substituted by at least one —COOR₃ residue and/or a methyl group, or residues of the general formula:

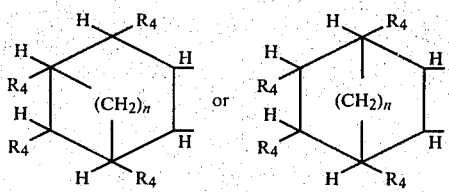

where
$R_1$ = H or —COOR$_3$ or CH$_3$—;
$R_2$ = H or CH$_3$—;
$R_3$ = H or an alkyl residue with 1 to 4 C atoms or a hydroxyalkyl residue with 1 to 4 C atoms;
$R_4$ = H or —COOR$_3$;
n = 0, 1 or 2.

Among the polycarboxylic acids belonging to the general formula and offering especially good results are for instance cyclohexane-1,2-dicarboxylic acid, cyclohexane-1,3-dicarboxylic acid, cyclohexane-1,4-dicarboxylic acid, tricyclodecane-dicarboxylic acid, endomethylenehexahydrophthalic acid, endoethylenehexahydrophthalic acid, 4-methylhexahydrophthalic acid, camphoric acid, cyclohexanetetracarboxylic acid and cyclobutanetetracarboxylic acid.

In addition to the polycarboxylic acids being suitable for esterification with the polyols, their monovalent or polyvalent esters with aliphatic alcohols having 1 to 4 C atoms or hydroxyalcohols having 1 to 4 C atoms also are appropriate for such purposes. Anhydrides also may be used so long as the polycarboxylic acids are capable of forming them.

The polyester resins used in the clear lacquers of the present invention may be modified by incorporating saturated and/or unsaturated monocarboxylic acids, for instance fatty acids derived from natural oils and fats, or synthetic fatty acids. However, aromatic monocarboxylic acids such as benzoic acid also may be esterified concurrently. In this manner a plurality of possible alkyl resins may be prepared. For the purposes of the present invention, their acid numbers and hydroxy numbers should respectively be between 0 and 150 and 20 and 300.

Aliphatic and/or cycloaliphatic polyols are used for esterifying the polycarboxylic acids. Illustratively suitable substances are trimethylolethane, trimethylolpropane, glycerin, pentaerythrite, further ethylene glycol, propylene glycol, hexanediol-1,6, neopentyl glycol, diethylene glycol, 1,3-dimethylolcyclohexane, 8- or 9-hydroxy-tricyclo (5,2,1,0$^{2.6}$)decane-3,4-epoxy (Union Carbide USA Polycyclol 1222). It is furthermore advantageous in this respect to make use of polyols of the general formula:

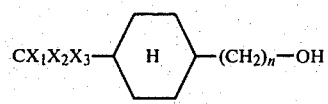

where
$X_1 = X_2 =$ H or CH$_3$—;
$X_3 =$ OH— or

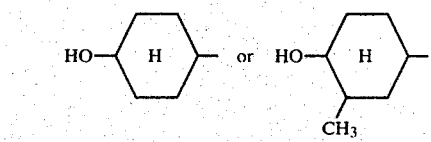

n = 0 or 1.

Especially good results are achieved with such polyalcohols of this general formula which are related to 1,4-dimethylolcyclohexane and to 4,4-dihydroxydicyclohexyl propane.

The above cited alkyd resins or polyester resins may furthermore be so modified that the aliphatic and/or cycloaliphatic polycarboxylic acids are partly replaced by cycloaliphatic polyisocyanates such as isophoronediisocyanate or by aliphatic polyisocyanates such as hexamethylene diisocyanate.

The products obtained when using polyisocyanates are polyester or alkyd resins containing urethane groups which are lumped into the expression "polyester resins" in the sense of the present invention.

The polyester resins are prepared by known methods. They are described and summarized in these reference works:

(1) Temple, C. Patton, Alkyd Resin Technology Interscience Publishers, John Wiley & Sons New York and London, 1962.
(2) Dr. Johannes Scheiber, Chemie und Technologie der kuenstlichen Harze, Wissenschaftliche Verlagsgesellschaft mbH, Stuttgart, 1943.
(3) Hans Wagner and Hans Friedrich Sarx, Lackkunstharze, 4th ed., Karl Hanser Verlag, Munich, 1959.

(4) Ullmanns Enzyklopaedie der technischen Chemie, volume 14, pp. 80–106, 1963.

The solutions of the polyester resins in organic solvents can be used as clear lacquers and provide clear, transparent coatings. It is however advantageous and proposed as such to use a clear lacquers those solutions in which the polyester resins are combined with an aminoplast resin. Such a combination allows adjusting at will many surface properties such as the hardness and elasticity of the coating.

Applicable aminoplast resins are known hardening condensation products as are obtained in known manner by reacting formaldehyde with urea or melamine. These are further ordinarily etherified, in part or in whole, with alkanols comprising from 1 to 6 C atoms.

Such condensates are described for instance in Ullmanns Enzyklopaedie der technischen Chemie, 3rd vol., pp. 475–496 (1953) and in Houben-Weyl, Methoden der organischen Chemie, vol. 14/2, pp. 319–388 (1963).

In another advantageous embodiment, the clear lacquer besides the polyester resin and any aminoplast resin may further contain a crosslinking acrylate resin itself containing hydroxyl groups. This results in good surface properties in coatings made from such clear lacquers.

Hereunder the term of crosslinking acrylate resins containing hydroxyl groups will mean known hardening copolymers made from esters of acrylic and/or methacrylic acids with monovalent alcohols with such esters of acrylic and/or methacrylic acids still containing functional hydroxyl groups and possibly also comprising other comonomers such as styrene, vinyltoluol, vinylester and also small amounts of monomers containing carboxyl groups which are polymerized-in, and as are obtained by known processes.

Such copolymers for instance are described in J. Scheiber, Chemie und Technologie der kuenstlichen Harze, vol. 1, pp. 652–709 L (1961).

The clear lacquers used in conformity with the present invention furthermore may contain conventional additives in the form of viscosity or foam controlling substances.

The clear lacquers used in conformity with the present invention result in coatings with improved resistance to weathering. This protection offered by the clear lacquer may be enhanced by adding ultraviolet absorbers. Known ultraviolet absorbers are derivatives from the group of benzotriazoles, oxamides, benzophenones and diphenylacrylonitrile acid esters.

The processing solutions are clear lacquers resulting in clear and transparent films which become hard elastic films following baking at temperatures between 80° and 200° C. for a time between 5 and 60 minutes, these films being endowed with a high resistance to chemical corrosion and to the effects of sunlight or ultraviolet radiation. After 2,500 hours in a Weather-O-meter test, using a carbon-arc lamp, no crack formation was observed, whereas the known lacquers, of which the polyester resins are high in aromatic constituents, already crack after 650 hours.

The clear lacquer is applied conventionally with a spray gun or by pouring, dipping or rolling. The dry-film thicknesses following hardening or baking as a rule will be between 5 and 50 microns.

The clear lacquers used in conformity with the present invention are preferred as the final coat in enamel multicoats of which the last layer, which is to be covered by the clear lacquer, contains pigments or metal pigments. If metal pigments are present, the enamel multicoat assumes the appearance of metallic effects or lusters.

If, for instance, it is desired to achieve a metal-luster enamel on a motor vehicle, the body as a rule is first immersed in an electrocoating bath and is coated anodically or cathodically. Following baking and possibly after grinding or sanding of this layer, a filler is deposited which following baking forms the substrate or the base for the enameling with the metal-luster effect. The base lacquer containing metal pigments and, if necessary to obtain a desired color tone, organic or inorganic coloring pigments or dyestuffs are deposited on the substrate. Aluminum, copper or other metals may be used in the form of powders or flakes as the metal pigments. The coloration of the various color tones is achieved by organic and/or inorganic pigments and/or soluble dyestuffs. The film-forming materials may be used provided they have artificial adhesion to the layer below them and to the clear lacquer layer above them.

Each layer of the enamel multicoat is dried individually or baked individually. It is advantageous, however, to apply the clear lacquer wet-on-wet to the base lacquer of this base layer. Then both lacquer layers are baked together at a temperature between 80° and 200° C. from 5 to 30 minutes.

Such an enamel multicoat offers an extraordinarily hard and scratch-resistant surface and furthermore is elastic. The surface is very glossy and retains this gloss even after appreciable time. The films are resistant to chemicals. The base lacquer film covered by the clear lacquer of the present invention offers improved resistance to atmospheric factors such as humidity, heat and ultraviolet light. Whereas a double layer metallic-luster material with a clear lacquer coating containing an alkyd resin on the bases of phthalic acid with aromatic groups cracks after 650 hours in the Weather-O-meter test, a double layer metal-luster material made according to the present invention remains free from defects even after 3,600 hours and more.

A so-called uni-colored multicoat system can be obtained by a similar procedure except that the base lacquer contains pigments conventional in lacquer manufacture which are other than the metal pigments.

SPECIFIC EXAMPLES

The following specific examples explain the present invention without however implying restriction thereto. Percentages are by weight. Viscosities are in mPas (millipascals).

EXAMPLE 1: COMPARISON (A) 1.0 mole of phthalic acid anhydride, 1.0 mole of pentaerythrite, 0.6 moles of coconut oil fatty acid, and 0.6 moles of 2-ethylhexanic acid are weighed and placed into a stirring vessel provided with heater, stirrer and distillation attachment, 20 g of xylol are added, and the mixture is raised to 180° C. within 1 hour while stirring. Within three hours the temperature is then raised to 220° C. and kept at 220° C. for 5 hours. The entire duration of reaction is under a nitrogen atmosphere. The water of reaction generated during the reaction is so distilled off that the xylol, which is used as a drag means, can always return to the reaction vessel. As soon as the reaction mixture reaches an acid number of 13 and a viscosity of 190 in mPas (measured as a 50% solution in xylol in the ICI plate-cone viscosimeter), it is cooled to below 140° C. and diluted further with xylol until a solution with a solid content of 60% is obtained. The hydroxyl number of the resin is 114.

(B) 55 G from this 60% solution of resin in xylol are used and reacted with 30 g of a 55% solution of a commercial, reactive partially butanol etherified melamine-formaldehyde condensation resin in butanol-xylol (2:1), and 15 g of a mixture of solvents of ethylglycol acetate and butylglycol acetate (1:1) are added. The clear lacquer obtained after thorough stirring has a solid content of 49% and an efflux time of 60 seconds from an efflux cup with a nozzle 4 mm in diameter according to German Industrial Standard DIN 53 211.

EXAMPLE 2

(A) Example 1 A is repeated except that 1.0 mole of hexahydrophthalic acid is used in lieu of 1.0 mole of phthalic acid anhydride. Observing a similar procedure, a polyester resin is obtained with an acid number of 14 and a viscosity of 140 mPas (measured as a 50% solution in xylol wth an ICI plate-cone viscosimeter), xylol being used to adjust the solid content to 60%. The OH number of the resin is 110.

(B) Similarly to Example 1B, 55 g of the 60% solution of resin 2A are reacted with 30 g of the melamine-formaldehyde resin solution described in 1B and with 15 g of a mixture of solvents of ethylglycol acetate and butylglycol acetate (1:1). The clear lacquer obtained following thorough stirring has a solid content of 40% and an efflux time of 61 seconds from an efflux cup with a nozzle 4 mm in diameter per DIN 53 211.

EXAMPLE 3

(A) Example 1A is repeated except that 1.0 mole of camphoric acid replaces the 1.0 mole of phthalic acid anhydride. A polyester resin with an acid number of 28 and a viscosity of 80 mPa (measured as a 50% solution in xylol in the ICI plate-cone viscosimeter) is obtained, which is adjusted by means of xylol to a solid content of 60%. The OH number of the resin is 120.

(B) The resin solution from 3A is used as in Example 1B and a clear lacquer with a solid content of 40%, an efflux time of 35 seconds from an efflux cup with a nozzle 4 mm in diameter per DIN 53 211 is obtained.

EXAMPLE 4

18.4 g of the 60% polyester resin solution prepared per Example 2A are reacted with 36.6 g of a 60% solution of a commercial thermosetting polymethacrylate-copolymer resin with less than 10% styrene polymerized-in and containing hydroxyl groups and with 30 g of the 55% solution of the melamine-formaldehyde resin described in Example 1B and mixed with 15 g of a mixture of solvents of ethylglycol acetate and butylglycol acetate (1:1) by thorough stirring. The clear lacquer so obtained has a solid content of 49% and an efflux time of 63 seconds in the efflux cup with a nozzle 4 mm in diameter per DIN 53 211.

EXAMPLE 5

(A) A saturated polyester is prepared from: 1.0 mole of hexahydrophthalic acid anhydride, 0.25 moles of trimethylol propane, 0.6 moles of ethyl-butyl-propanediol-1,3, and 0.2 moles of 2,2-methylphenyl-propanediol-1,3.

The materials are weighed-in at the cited amounts in a reaction vessel with filler tube, descending distillation condenser and stirrer. 10 g of a higher-boiling fraction of aromatics (boiling point interval: 150°-170° C.) are added to the reaction mixture and the procedure of Example 1A is then followed, the temperature in the reaction vessel being so controlled that it does not exceed 105° C. at the top of the filler tube. A nitrogen atmosphere is used. After 10 hours the reaction mixture reaches an acid number of 11 and a viscosity of 320 mPas (measured as 60% solution in xylol in the ICI plate-cone viscosimeter). The saturated polyester so obtained is dissolved in xylol to obtain a solution with a solid content of 60%. The hydroxyl number of the resin in 78.

(B) 55 g of the resin solution obtained per 5A are reacted with 30 g of the melamine-formaldehyde resin solution described in Example 1B and diluted with 15 g of a solvent mixture of ethylglycol acetate and butylglycol acetate (1:1) and are well mixed by stirring. The clear lacquer so obtained has a solid content of 49% and an efflux time of 43 seconds in the efflux cup with a nozzle 4 mm in diameter per DIN 53 211.

EXAMPLE 6

Example 2 is repeated except that 1.5% by weight of 2,2',4,4'-tetrahydroxybenzophenone is added as ultraviolet light absorber to the clear lacquer obtained per 2B.

EXAMPLE 7

The clear lacquer obtained per Examples 1 through 6 are adjusted by means of a mixture of solvents of xylol-butyl acetate in the ratio of 2:1 to a working consistency (about 20 to 23 seconds efflux time from an efflux cup with a 4 mm nozzle) for spraying on prepared iron sheet metal panels by means of spray guns. For preparing the sheet metal panels they are first passivated by iron phosphatizing and they receive then an electrocoat layer from an electrocoating primer by using an electrodeposition process. The electrocoat layer is then baked, whereupon they are coated with a commercial baking filler and also baked. The panels so prepared are divided into two equal parts. On one set of these panels there is applied a base coat by means of a commercial paint material based on acrylate-resin/melamine-resin. On the other set there is applied a base coat from a commercial paint material based on an aluminum pigment and a transparent iron oxide red pigment. On the base coat layers of both sets there is sprayed wet-on-wet by a spray gun the clear lacquer of Examples 1-6. Following an air drying time of 15 minutes, baking is performed for 15 to 30 minutes at 130° C. in a circulating-air oven. The tests are carried out in such a manner that the dry thickness of the clear lacquer layer is between 35 and 40 microns and the overall thickness of the base coat and clear coat is about 120 microns. The panels so prepared and coated with the two-layer metallic system are stored in a climate-controlled chamber at 23° C. and a relative humidity of 50% for 24 hours, whereupon they are tested as follows:

(1) Erichsen test (2) Pendulum hardness (seconds)

3. Weather-O-meter with carbon arc lamp—permanent light exposure Cycling: 17 minutes drying followed by 3 minutes rain, black panel temperature: 65° C. maximum (4) Weather-O-meter edge filters with xenon-burner Cycling: 10 minutes drying, 10 minutes rain black panel temperature: 65° C. maximum.

The test results are shown summarized in the table.

TABLE I

| | Clear Lacquer per Example | | | | | |
|---|---|---|---|---|---|---|
| | 1 | 2 | 3 | 4 | 5 | 6 |
| On polyester Base Coat | | | | | | |
| Layer thickness: | | | | | | |
| (a) Overall | ca. 120 μm | 120 μm | 120 μm | 120 μm | 120 μm | 120 μm |
| (b) Clear Lacquer Coating | 35–40 μm | 35–40 μm | 35–40 μm | 35–40 μm | 35–40 μm | 35–40 μm |
| Weather-O-meter (carbon-arc lamp) cracked after so many hours | 650 | >3500 | 2500 | 2800 | >3500 | >3500 |
| Weather-O-meter (edge-filter, xenon burner) cracked after so many hours | 374 | >1480 | 900 | 1000 | >1480 | >1480 |
| On Polyacrylate Base Coat | | | | | | |
| Layer Thickness: | | | | | | |
| (a) Overall | ca. 120 μm | 120 μm | 120 μm | 120 μm | 120 μm | 120 μm |
| (b) Clear Lacquer Coating | 35–40 μm | 35–40 μm | 35–40 μm | 35–40 μm | 35–40 μm | 35–40 μm |
| Weather-O-meter (carbon-arc lamp) cracked after so many hours | 650 | >3500 | 2800 | 2600 | >3500 | >3500 |
| Weather-O-meter (edge-filter, xenon burner) cracked after so many hours | 374 | >1027 | 1000 | 1100 | >1027 | >1027 |

EXAMPLE 8

(A) Example 1A is repeated except that 1.0 mole of 3,6-endomethylene-hexahydrophthalic acid replaces the 1.0 mole of phthalic acid anhydride. The procedure is the same as in Example 1A, and an alkyd resin with an acid number of 32 and a viscosity of 580 mPas (measured in a 50% solution in xylol in the ICI plate-cone viscosimeter) is obtained. The hydroxyl number is 122. The resin is diluted with xylol to a solid content of 60%.

(B) Similarly to Example 1B and the amounts used therein, a clear lacquer with a solid content of 49% is made. The efflux time from an efflux cup with a nozzle 4 mm in diameter per DIN 53 211 is 56 seconds.

EXAMPLE 9

(A) An alkyd resin is prepared from: 1.0 mole of hexahydrophthalic acid, 1.05 moles of trimethylolpropane, 0.4 moles of coconut oil fatty acid, and 0.3 moles of benzoic acid.

The above raw materials are weighed-in at a reaction vessel with filler tube, descending distillation condenser and stirrer in the amounts given. 10 g of xylol are added to the reaction mixture and the procedure continues as described in Example 1A. An alkyd resin with an acid number of 12 and a viscosity of 400 mPas (measured in a 50% solution in xylol in the ICI plate-cone viscosimeter) is obtained. The OH number of the alkyd resin is 78. The resin is diluted with xylol to a 60% solution and used for preparing a clear lacquer.

(B) A clear lacquer is made from the resin solution 9A according to the procedure described in 1A and using the same quantities. The solid content is 49% and the efflux time from an efflux cup with a nozzle 4 mm in diameter per DIN 53 211 is 46 seconds.

EXAMPLE 10

(A) An alkyd resin is prepared from: 1.0 mole of hexahydrophthalic acid, 1.0 mole of pentaerythrite, 0.4 moles of tall oil fatty acid low in resinic acid, and 0.8 moles of 2-ethylhexane acid.

These raw materials are weighed-in in the amounts cited and made to react according to the procedure of Example 1A. An alkyd resin with an acid number of 8.5 and a viscosity of 290 mPas (measured as 50% solution in xylol in the ICI plate-cone viscosimeter) is obtained. The hydroxyl number of the resin is 81. The alkyd resin so obtained is dissolved using xylol to achieve a solid content of 60%.

(B) A clear lacquer is prepared from the resin solution 10A following the procedure of Example 1B, using the amounts stated therein, the solid content of the clear lacquer being 49%. The efflux time form the efflux cup with a nozzle 4 mm in diameter per DIN 53 211 is 58 seconds.

EXAMPLE 11

(A) A saturated polyester is prepared from: 0.8 moles of hexahydrophthalic acid anhydride, 0.2 moles of adipic acid, 0.45 moles of ethylene glycol, 0.45 moles of neopentylglycol, and 0.2 moles of trimethylolpropane.

The raw materials are weighed-in in the stated amounts according to Example 5A into a reaction vessel and the procedure of Example 5A is followed. The polyester so obtained is diluted with a mixture of solvents of xylol and ethylglycol acetate in the ratio of 3:1 into a solution with a 60% solid content. The polyester has an acid number of 8.5 and the 60% solution has a viscosity of 680 mPas (measured in the ICI plate-cone viscosimeter). The hydroxyl number of the polyester is 106.

(B) 55 g from the 60% solution obtained in 11A are weighed-in and reacted with 30 g of a 55% solution of a commercial, reactive, melamine-formaldehyde condensation resin partly etherified with methanol, in butanol-xylol (2:1), and 15 g of a mixture of solvents of ethylglycol acetate and butylglycol acetate (1:1) are further added. The clear lacquer obtained after thorough stirring has a solid content of 49% and an efflux time of 45 seconds from an efflux cup with a nozzle 4 mm in diameter per DIN 53 211.

EXAMPLE 12

(A) A saturated polyester is prepared from: 0.5 moles of succinic acid, 0.5 moles of adipic acid, 0.9 moles of perhydrobisphenol-A, and 0.25 moles of trimethylolpropane.

The raw materials are weighed-in in the amounts stated and the reaction is carried out as indicated for Example 5A. The resin so obtained is diluted with a mixture of solvents of ethylglycol acetate and a medium boiling aromatic hydrocarbon fraction (boiling point limits between 160° and 175° C.) in the ratio of 1:1 into a 60% resin solution. The polyester so obtained has an acid number of 25 and the 60% solution has a viscosity of 450 mPas (measured in the ICI plate-cone viscosimeter). The hydroxyl number of the polyester resin is 114.

(B) A clear lacquer is obtained from the synthetic resin obtained in Example 12A, following the procedure of Example 11B and the amounts used in the latter, the solid content being 49% and the efflux time from an efflux cup with a nozzle 4 mm in diameter per DIN 53 211 is 67 seconds.

EXAMPLE 13

(A) A saturated polyester is prepared from: 0.7 moles of hexahydrophthalic acid, 0.3 moles of adipic acid, 0.2 moles of trimethylol propane, 0.4 moles of 1,4-dimethylolcyclohexane, 0.3 moles of propyleneglycol, and 0.2 moles of ethylene glycol.

The raw materials are weighed-in in the stated amounts and the procedure follows that of Example 5A. A 60% resin solution is obtained. The polyester resin has an acid number of 25 and the viscosity of the 60% solution is 430 mPas (measured in the ICI plate-cone viscosimeter). The hydroxyl number of the polyester resin is 105.

(B) A clear lacquer solution with a solid content of 49% is obtained from the resin solution from Example 13A following the procedure and the data of Example 1B. The efflux time of the solution is 57 seconds in the efflux cup with a 4 mm diameter nozzle of DIN 53 211.

EXAMPLE 14

Proceeding precisely as in Example 7, the clear lacquer obtained under Examples 8 through 13 is adjusted to a working consistency using a mixture of solvents of xylolbutylacetate in the ratio of 2:1 and is sprayed wet-on-wet on the sheet metal panels described in Example 7 and provided with the base lacquer coatings. Following ventilation of 15 minutes, baking is carried out in an air circulating oven for 30 minutes at 130° C. and the material is stored in a climate chamber at 23° C. for 24 hours at a relative humidity of 50%. The tests listed in Example 7 then are carried out. Table II shows the test results.

TABLE II

| | Clear Lacquer per Example | | | | | |
|---|---|---|---|---|---|---|
| | 8 | 9 | 10 | 11 | 12 | 13 |
| On polyester Base Coat | | | | | | |
| Layer Thickness: | | | | | | |
| (a) overall | ca. 120 μm | 120 μm | 120 μm | 120 μm | 120 μm | 120 μm |
| (b) clear layer coating | 35–40 μm | 35–40 μm | 35–40 μm | 35–40 μm | 35–40 μm | 35–40 μm |
| Weather-O-meter (carbon-arc lamp) cracked after so many hours | 3000 | >3500 | 2800 | 2800 | 2500 | >3500 |
| Weather-O-meter (edge-filter, xenon-burner) cracked after so many hours | 1400 | >1400 | 1000 | 1100 | 900 | >1400 |
| On Polyacrylate Base Coat | | | | | | |
| Layer Thickness | | | | | | |
| (a) overall | ca. 120 μm | 120 μm | 120 μm | 120 μm | 120 μm | 120 μm |
| (b) clear lacquer coating | 35–40 μm | 35–40 μm | 35–40 μm | 35–40 μm | 35–40 μm | 35–40 μm |
| Weather-O-meter (carbon arc lamp) cracked after so many hours | 2800 | 3400 | 2500 | 2600 | 2000 | 3500 |
| Weather-O-meter (edge filter, xenon-burner) cracked after so many hours | 1200 | >1400 | 900 | 1000 | 750 | 1250 |

We claim:

1. In an article having a substrate and a multilayer coating composition adhered thereto, said composition comprising:
   A. a dried nonaqueous base film produced from a composition comprising:
      1. a first film-forming material selected from the group consisting of alkyd resins, polyester resins, acrylic resins, and polyurethane resins, wherein said first film-forming material contains from about 2 to about 50 weight percent, based on the film-forming solids, of a cellulose ester,
      2. uniformly dispersed pigments, and 3. volatile organic solvents for said first film-forming material, and B. a baked transparent coating composition deposited on said base film in a relationship to maintain substantially no intermixing and no intersolution of said base film and said transparent coating composition, said transparent coating composition comprising:

1. a second film-forming material selected from the group consisting of alkyd resins, polyester resins, acrylic resins and polyurethane resins, and
2. volatile organic solvents for said second film-forming material, the improvement comprising: said second film-forming material consisting essentially of polyester resins comprising a crosslinking resin containing hydroxyl groups obtained by esterifying polycarboxylic acids selected from the group consisting of aliphatic polycarboxylic acids, cycloaliphatic polycarboxylic acids, and mixtures thereof with polyols selected from the group consisting of aliphatic polyols, cycloaliphatic polyols and mixtures thereof.

2. The article of claim 1, wherein said transparent coating composition contains a hydroxyl group containing acrylate resin as a further film-forming component.

3. The article of claim 2, wherein said hydroxyl group containing acrylate resin is free from aromatic groups.

4. The article of claim 2, wherein said hydroxyl group containing acrylate resin holds up to 15% by weight of monomers containing aromatic groups polymerized therein.

5. The article of claim 1, wherein said transparent coating composition contains:
10 to 40% by weight of aminoplast resin
60 to 90% by weight of a mixture of
  5 to 100% by weight of a polyester resin containing hydroxyl groups, an alkyl resin, or a mixture thereof, and
  0 to 95% by weight of acrylate resin containing hydroxyl groups,
where the same sums of the percentages by weight amount to 100%.

6. The article of claim 5, wherein said transparent coating composition further contains synthetic resins different from but compatible with the polyester resins, alkyd resins, acrylate resins and aminoplast resins.

7. The article of claim 1, wherein said polycarboxylic acid component of the hydroxyl group containing polyester resin contains cycloaliphatic polycarboxylic acids of the general formula

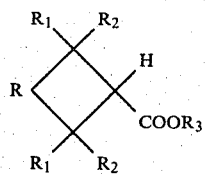

where R stands for a non-substituted alkylene residue with 1 to 4 C atoms, or which is substituted by at least one —COOR₃ residue and/or a methyl group, or for residues of the general formula

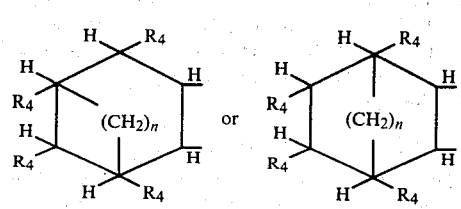

wherein
$R_1$ = H or —COOR$_3$ or CH$_3$—;
$R_2$ = H or CH$_3$—;
$R_3$ = H or an alkyl residue with 1 to 4 C atoms of a hydroxylalkyl residue with 1 to 4 C atoms;
$R_4$ = H or —COOR$_3$;
n = 0, 1 or 2.

8. The article of claim 1, wherein the polyester resins are modified by saturated fatty acids, unsaturated fatty acids and mixtures thereof, being esterified therein.

9. The article of claim 1, wherein the polyester resins contain aromatic monocarboxylic acids esterified therein.

10. The article of claim 5, wherein the polyol component of the polyester resin containing hydroxyl groups or of the alkyd resin contains cycloaliphatic polyols of the general formula

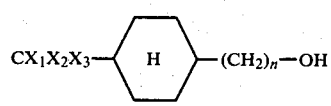

where
$X_1 = X_2 =$ H or CH$_3$—;
$X_3 =$ OH— or

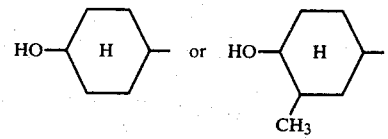

n = 0 or 1.

11. The article of claim 1, wherein said base film contains organic or inorganic pigments or mixtures thereof.

12. The article of claim 1, wherein said base film contains metal pigments.

13. In a process for preparing an article having a substrate and a multilayer coating composition adhered thereto, comprising:

A. depositing a nonaqueous base film with drying a composition comprising:
1. a first film-forming material selected from the group consisting of alkyd resins, polyester resins, acrylic resins, and polyurethane resins, wherein said first film-forming material contains from about 2 to about 50 weight percent, based on the film-forming solids, of a cellulose ester,
2. uniformly dispersed pigments, and
3. volatile organic solvents for said first film-forming material, and B. depositing with baking a transparent coating composition on said base film in a relationship to maintain substantially no intermixing and no intersolution of said base film and said transparent coating composition, said transparent coating composition comprising:
1. a second film-forming material selected from the group consisting of alkyd resins, polyester resins, acrylic resins and polyurethane resins, and
2. volatile organic solvents for said second film-forming material, the improvement comprising: said second film-forming material consisting essentially of polyester resins comprising a crosslinking resin containing hydroxyl groups and obtained by esterifying polycarboxylic acids selected from the group consisting of aliphatic polycarboxylic acids, cycloaliphatic polycarboxylic acids and mixtures thereof with polyols selected from the group consisting of aliphatic polyols, cycloaliphatic polyols and mixtures thereof.

14. The process of claim 13, wherein said transparent coating composition is deposited wet-on-wet on a last enamel layer containing the pigments and/or metal pigments and both layers are baked simultaneously.

* * * * *